(12) United States Patent
Kawasaki et al.

(10) Patent No.: US 11,973,905 B2
(45) Date of Patent: Apr. 30, 2024

(54) INFORMATION PROCESSING SYSTEM, INFORMATION PROCESSING METHOD, NON-TRANSITORY RECORDING MEDIUM, AND INFORMATION PROCESSING APPARATUS

(71) Applicants: Hajime Kawasaki, Chiba (JP); Makoto Aoki, Tokyo (JP)

(72) Inventors: Hajime Kawasaki, Chiba (JP); Makoto Aoki, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/178,873

(22) Filed: Mar. 6, 2023

(65) Prior Publication Data

US 2023/0308558 A1    Sep. 28, 2023

(30) Foreign Application Priority Data

Mar. 23, 2022   (JP) ................. 2022-046673

(51) Int. Cl.
*G06F 3/12* (2006.01)
*G06K 15/02* (2006.01)
*H04N 1/00* (2006.01)

(52) U.S. Cl.
CPC ..... *H04N 1/00334* (2013.01); *G06K 15/1806* (2013.01); *H04N 2201/0082* (2013.01)

(58) Field of Classification Search
None
See application file for complete search history.

(56) References Cited

U.S. PATENT DOCUMENTS

| | | | |
|---|---|---|---|
| 2004/0144472 A1* | 7/2004 | Cowie | B42D 25/45 156/219 |
| 2012/0030678 A1* | 2/2012 | Hayduchok | H04N 1/32122 718/101 |
| 2019/0384553 A1* | 12/2019 | Wakamatsu | G06F 3/1273 |
| 2020/0034592 A1* | 1/2020 | Kawasaki | G06F 3/1203 |
| 2020/0293239 A1 | 9/2020 | Kawasaki et al. | |
| 2021/0132874 A1 | 5/2021 | Kawasaki et al. | |

(Continued)

FOREIGN PATENT DOCUMENTS

| | | | |
|---|---|---|---|
| JP | 2007-193614 | 8/2007 | |
| JP | 2009141700 | * 6/2009 | ............... G06F 3/12 |

(Continued)

*Primary Examiner* — Beniyam Menberu
(74) *Attorney, Agent, or Firm* — IPUSA, PLLC

(57) ABSTRACT

An information processing system, an information processing method, a non-transitory recording medium, and an information processing apparatus. The information processing system captures a plurality of images at respective locations each associated with a location where the object is managed, or a process performed on the object to be managed, generates print data of a second slip associated with the plurality of objects to be managed, the second slip being different from a first slip associated with each of the plurality of objects, and controls a display to display, based on detection of the printed second slip from the image captured by the imaging device, the plurality of objects to be managed associated with the printed second slip, as being placed at the location or the process associated with the imaging device that captured the image of the second slip.

13 Claims, 16 Drawing Sheets

(56) References Cited

U.S. PATENT DOCUMENTS

| | | |
|---|---|---|
| 2021/0240957 A1 | 8/2021 | Kawasaki et al. |
| 2021/0294548 A1* | 9/2021 | Kawasaki ............. G06F 3/1285 |
| 2021/0297553 A1 | 9/2021 | Kawasaki et al. |
| 2022/0300217 A1 | 9/2022 | Kawasaki et al. |
| 2022/0303410 A1 | 9/2022 | Kawasaki et al. |
| 2023/0231955 A1* | 7/2023 | Clark ................ H04N 1/00358 |
| | | 358/448 |

FOREIGN PATENT DOCUMENTS

| | | | | |
|---|---|---|---|---|
| JP | 2018055355 | * | 4/2018 | ............... G06F 3/12 |
| JP | 2018177510 | * | 11/2018 | ............ B65H 33/04 |
| JP | 2020-022014 | | 2/2020 | |
| JP | 2020-024658 | | 2/2020 | |
| JP | 2020021181 | * | 2/2020 | ............ G06K 19/06 |
| JP | 2021149945 | * | 9/2021 | ............... G06F 3/12 |

\* cited by examiner

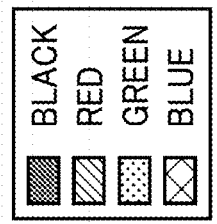
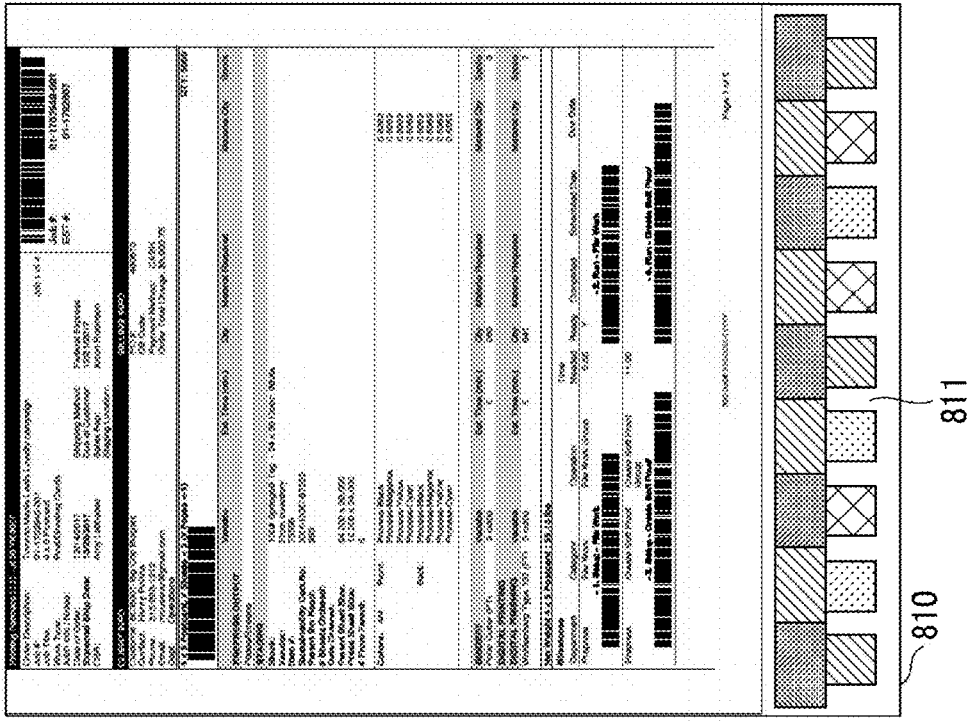
FIG. 2B
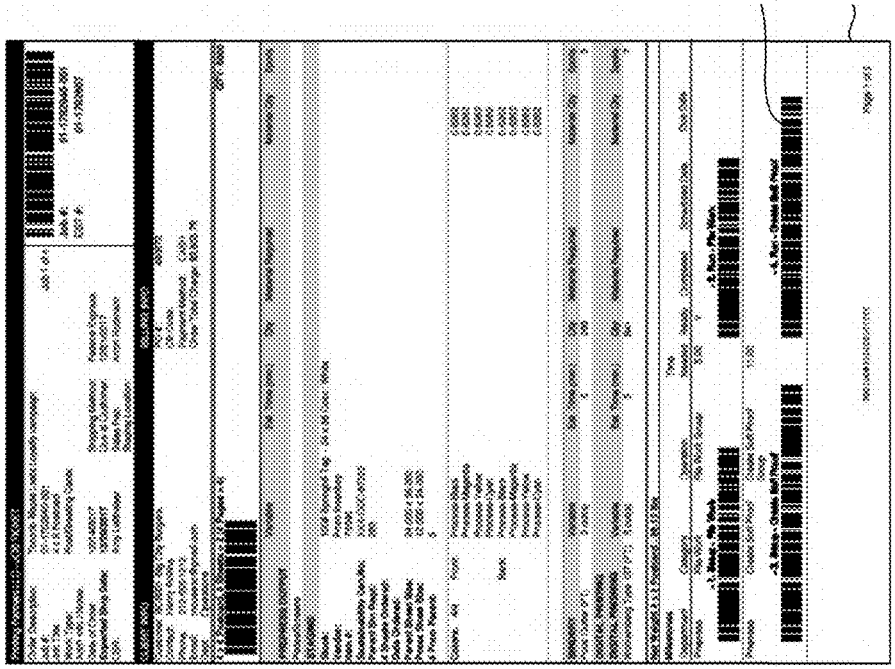
FIG. 2A

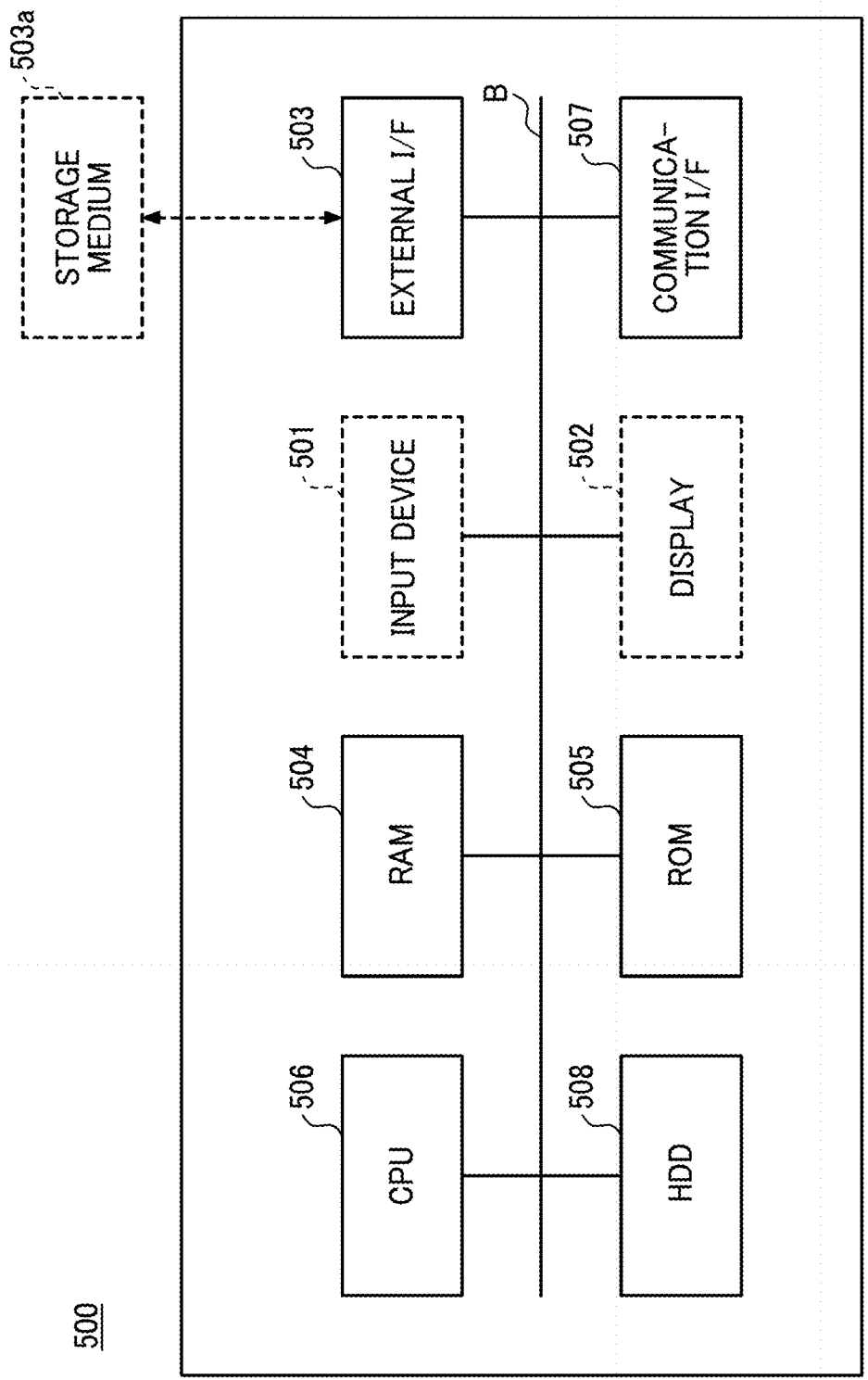

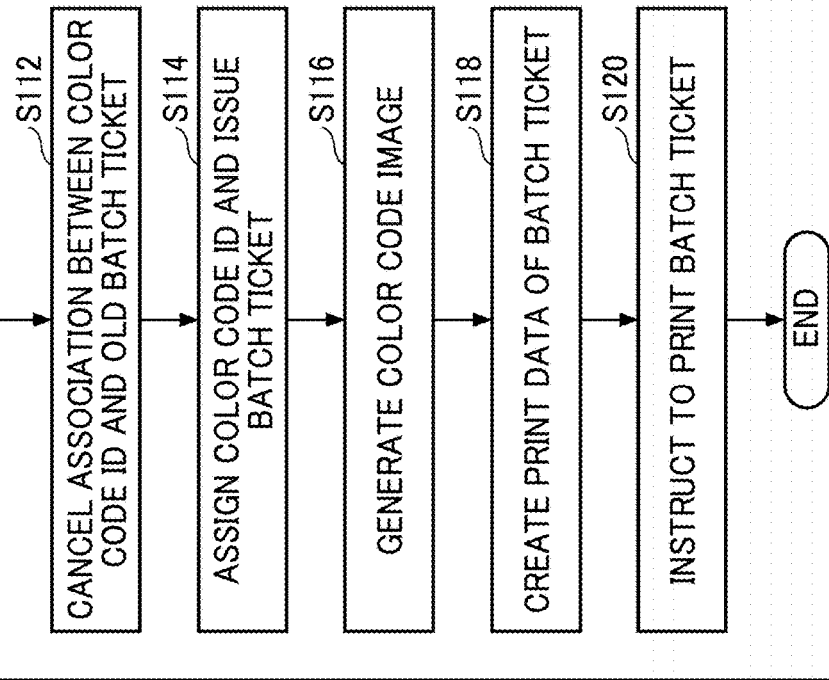
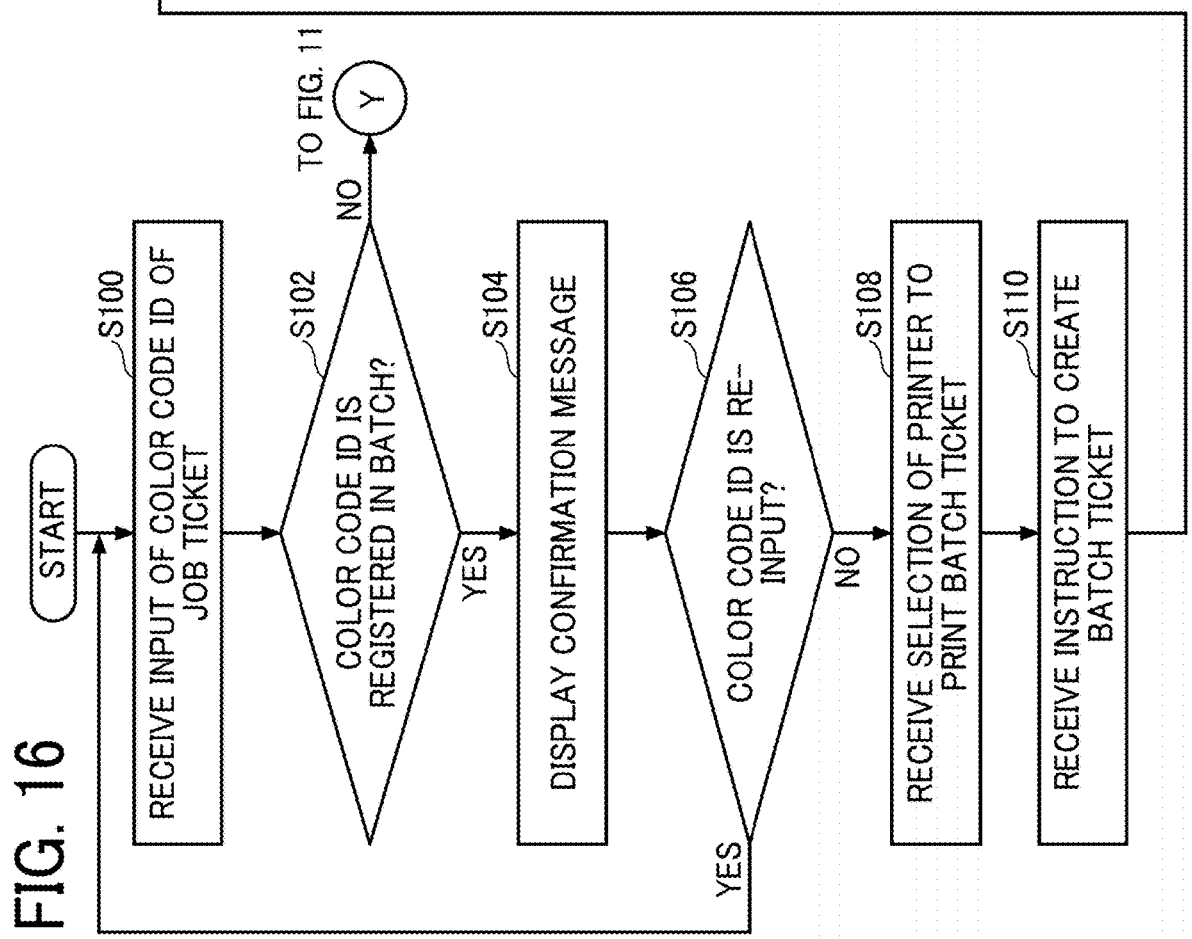
FIG. 16

INFORMATION PROCESSING SYSTEM, INFORMATION PROCESSING METHOD, NON-TRANSITORY RECORDING MEDIUM, AND INFORMATION PROCESSING APPARATUS

CROSS-REFERENCE TO RELATED APPLICATIONS

This patent application is based on and claims priority pursuant to 35 U.S.C. § 119(a) to Japanese Patent Application No. 2022-046673, filed on Mar. 23, 2022, in the Japan Patent Office, the entire disclosure of which is hereby incorporated by reference herein.

BACKGROUND

Technical Field

The present disclosure relates to an information processing system, an information processing method, a non-transitory recording medium, and an information processing apparatus.

Background Art

A technique for managing progress of a job including a plurality of processes by using barcodes or the like have been conventionally known. For example, by capturing a code image associated with the job at each location associated with a process, identifying the job from the code image, and associating and managing the process associated with a captured location with the job identified from the code image is a conventionally known technique. Further, a technique for providing a user with information on a progress of multiple jobs including multiple processes by managing the job identified from the code image in association with the process associated with the location where the image is captured is disclosed.

SUMMARY

Embodiments of the present disclosure describe an information processing system, an information processing method, a non-transitory recording medium, and an information processing apparatus. The information processing system captures a plurality of images at respective locations each associated with a location where the object is managed, or a process performed on the object to be managed, generates print data of a second slip associated with the plurality of objects to be managed, the second slip being different from a first slip associated with each of the plurality of objects, and controls a display to display, based on detection of the printed second slip from the image captured by the imaging device, the plurality of objects to be managed associated with the printed second slip, as being placed at the location or the process associated with the imaging device that captured the image of the second slip.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIGS. 2A and 2B are diagrams illustrating an example of a job ticket used in the job management system according to embodiments of the present disclosure;

FIG. 3 is a block diagram illustrating an example of a hardware configuration of a computer;

FIG. 16 is a flowchart illustrating an example of a process for issuing the batch ticket according to embodiments of the present disclosure.

Figure 1:
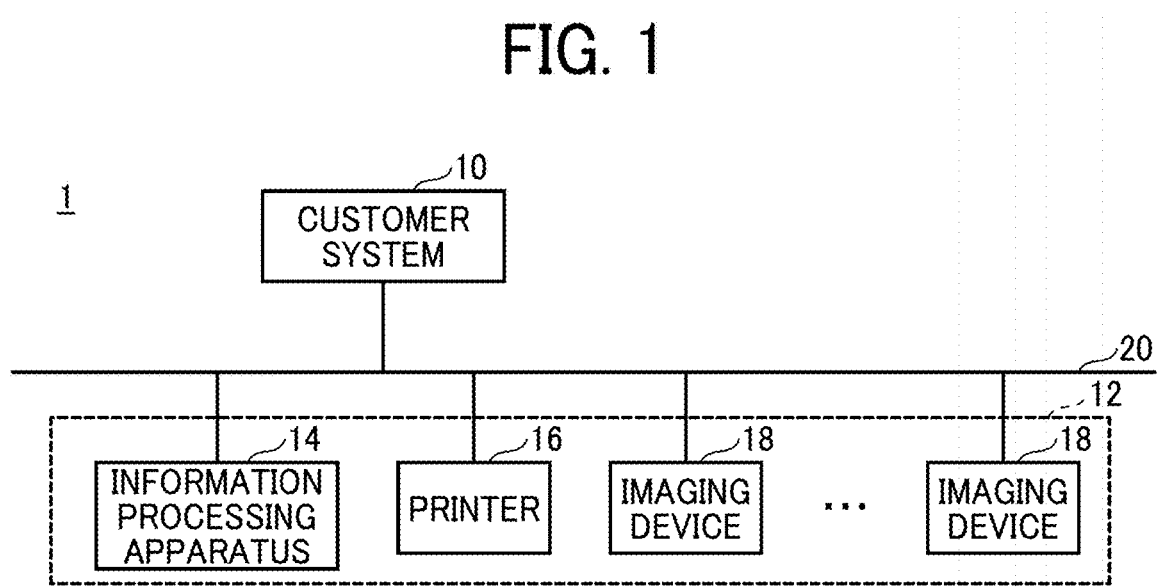
FIG. 1 is a block diagram illustrating an example of a configuration of a job management system according to embodiments of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Hereinafter, a description is given of several embodiments of the present disclosure with reference to the drawings. In the present embodiment, an example of an information processing system for managing job location or process in a printing factory by identifying location of a color code image, which is an example of a code image, is described.

FIG. 1 is a block diagram illustrating an example of a configuration of a job management system according to the present embodiment. FIGS. 2A and 2B are diagrams illustrating an example of a job ticket used in the job management system according to the present embodiment. In the job management system 1 of FIG. 1, a customer system 10, an information processing apparatus 14, a printer 16, and one or more imaging devices 18 are communicably connected to each other through a network 20 such as the internet or a local area network (LAN).

The customer system 10 is an example of an existing system used by a customer, and creates a job ticket 800 for the customer system 10 illustrated in FIG. 2A, in which a job identifier (ID) is indicated. For example, the job ticket 800 in FIG. 2A is a work instruction. The job ID is an example of identification information for identifying the job.

A barcode image 801 for the customer system 10 is indicated on the job ticket 800 to be used by the customer system 10 as illustrated in FIG. 2A. The job ID may be indicated by the barcode image 801 or by text on the job ticket 800 for the customer system 10. The customer system 10 provides the user with an existing function implemented by the job ticket 800 for the customer system 10.

The information processing apparatus 14, the printer 16, and one or more imaging devices 18 together operate as an information processing system 12 that adds a new function to the job ticket 800. The information processing system 12 manages a progress of a job including a plurality of processes, using a job ticket 810 for the information processing system 12 to which the color code image 811 of FIG. 2B is attached, and a batch ticket described below. The job ticket 810 in FIG. 2B is an example of a first slip, such as a work order. The batch ticket is an example of a second slip.

The information processing apparatus 14 manages the progress of the job including the plurality of processes as described below, using the job ticket 810 and a captured image of the batch ticket described below. The information processing system 12 identifies the job ID from the job ticket 810 and the captured image of the batch ticket described below.

The printer 16 prints the job ticket 810 and the batch ticket described below. The imaging device 18 is installed so as to capture an image of a location associated with the process of the job in the printing factory. For example, the imaging device 18 is installed above the location associated with the job process to capture the image of the lower location associated with the job process in the printing factory. The location associated with the job process is one or more places each associated with a work step in the printing factory. The location associated with the job process in the printing factory is a place included in the range of managing the location of an object to be managed, for example, a space, a table, a rack, a room, and the like, that is a place where the object to be managed such as a printed matter pass during movement between work processes, temporary storage places where the object to be managed is temporarily stored, and the like. The range for managing the location of the object to be managed is a management area in which the job ticket 810 associated with the object to be managed and the batch ticket (described below) are captured by the imaging device 18.

A pan-tilt-zoom (PTZ) camera or an internet protocol (IP) camera is used as the imaging device 18. The PTZ camera is a camera capable of operating a PTZ function through the network 20 and also capable of transmitting the captured images and captured moving images through the network 20. The IP camera is a camera operated through the network 20 and capable of transmitting the captured images and captured moving images through the network 20. The imaging device 18 transmits the captured image and the captured moving image to the information processing apparatus 14 through the network 20.

In the printing factory, the job ticket 810 and the batch ticket (described below) are attached to the printed matter, which is an example of an intermediate product or material of the job associated with the job ticket 810 and the batch ticket (described below). For example, the job ticket 810 and the batch ticket described below are attached on the printed matter that is the object to be managed.

The information processing apparatus 14 manages the location, process, and the like of the object to be managed by identifying the job ticket 810 and the color code image of the batch ticket (described below) from the images captured by the respective imaging devices 18. Further, the information processing apparatus 14 manages the progress of the process (job status) by managing the location of the object to be managed, the process, or the like. The information processing apparatus 14 may manage a history of the work process of the job, and the captured images and captured moving images representing the state of the job ticket 810 and the batch ticket (described below). The information managed by the information processing apparatus 14 is updated and accumulated according to the image captured by the imaging device 18, and is stored as information to be presented to the user.

Note that the configuration of the job management system 1 illustrated in FIG. 1 is an example. For example, the job management system 1 may include another system, and the information processing apparatus 14 may be given another name such as a work process management system. The information processing apparatus 14 may be implemented in a single server, or may be implemented in a plurality of servers.

The customer system 10 and the information processing apparatus 14 are implemented by, for example, a computer 500 having a hardware configuration as illustrated in FIG. 3.

FIG. 3 is a block diagram illustrating an example of the hardware configuration of the computer. The computer 500 of FIG. 3 includes an input device 501, a display 502, an external interface (I/F) 503, a random access memory (RAM) 504, a read only memory (ROM) 505, a central processing unit (CPU) 506, a communication interface (I/F) 507, and a hard disk drive (HDD) 508 mutually connected through a bus B. Note that the input device 501 and the display 502 may be connected to the bus B when used.

The input device 501 includes a keyboard, a mouse, and a touch panel to enable the user to input various operational signals. The display 502 displays a result of processing performed by the computer 500.

The communication I/F 507 is an interface for connecting the computer 500 to various networks. The computer 500 performs data communication through the communication i/F 507.

The HDD 508 is an example of a nonvolatile storage device storing programs and data. Examples of the programs and data include an operating system (OS) as basic software for controlling an entire operation of the computer 500 and application software providing various functions on the OS. The application software may be referred to as an "application" hereinafter, in order to simplify description. The computer 500 may include, instead of or in addition to the HDD 508, a drive device such as a solid state drive (SSD) that uses a flash memory as a storage medium.

The external I/F 503 is an interface for connecting to an external device. Examples of the external device include a storage medium 503a. The external I/F 503 enables the computer 500 to read or write data from or to the storage medium 503a. Examples of the storage medium 503a include a flexible disk, a compact disc (CD), a digital versatile disc (DVD), a secure digital (SD) memory card, and a universal serial bus (USB) memory.

The ROM 505 is an example of a nonvolatile semiconductor memory (storage) capable of storing the programs and data even when the power is not supplied. The ROM 505 stores programs and data such as a basic input output system (BIOS), which is executed when the computer 500 starts up, OS settings, and network settings. The RAM 504 is an example of a volatile semiconductor memory (storage device) that temporarily stores program and data.

The CPU 506 loads programs or data from a storage device such as the ROM 505 and the HDD 508 onto the RAM 504 and executes processes to implement overall control of the computer 500 or functions of the computer 500. The customer system 10 and the information processing apparatus 14 perform various types of processing, which are described below, by the hardware configuration of the computer 500 as illustrated in FIG. 3, for example. A description of the hardware configuration of the printer 16 and the imaging device 18 is omitted.

Figure 4:
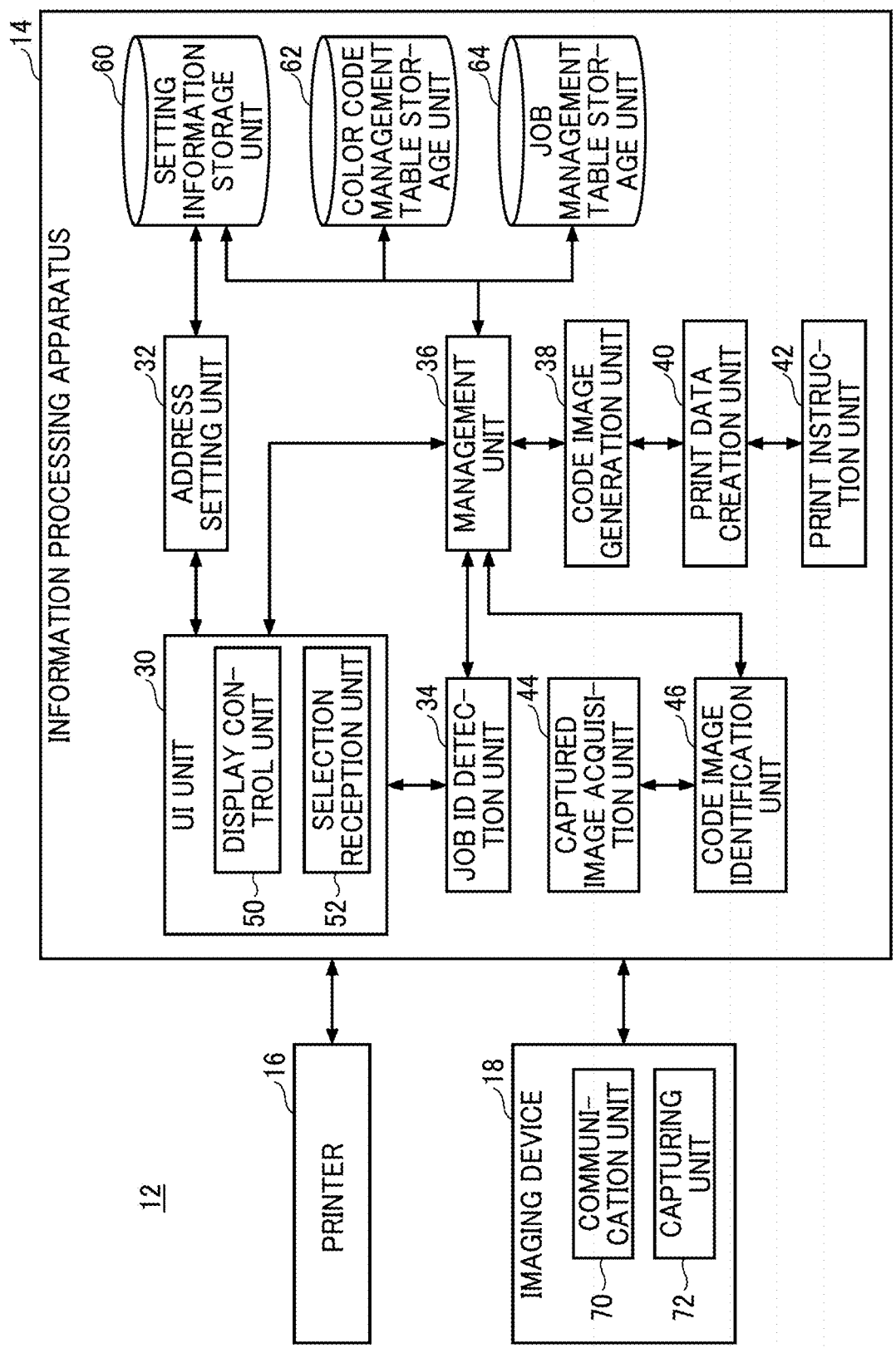
FIG. 4 is a block diagram illustrating an example of a functional configuration of the information processing system according to embodiments of the present disclosure.

FIG. 4 is a block diagram illustrating a functional configuration of the information processing system according to the present embodiment. Note that the functional configuration illustrated in FIG. 4 omits components that are not used in the description of the present embodiment as appropriate. The information processing apparatus 14 of FIG. 4 includes a user interface (UI) unit 30, an address setting unit 32, a job ID detection unit 34, a management unit 36, a code image generation unit 38, a print data creation unit 40, a print instruction unit 42, a captured image acquisition unit 44, a code image identification unit 46, a setting information storage unit 60, a color code management table storage unit 62, and a job management table storage unit 64. The UI unit 30 includes a display control unit 50 and a selection reception unit 52. Further, the imaging device 18 includes a communication unit 70 and a capturing unit 72.

The UI unit 30 provides the user interface to the user. The display control unit 50 of the UI unit 30 controls display of various screens for the user. For example, the display control unit 50 displays the location or process of the object to be managed identified from the captured image. The selection reception unit 52 of the UI unit 30 receives various operations from the user.

The address setting unit 32 receives setting information from the user and controls the process of storing the setting information in the setting information storage unit 60. For example, the address setting unit 32 receives designation of map images including the layout and floor plan of the management area, which is the range for managing the location or process of the object to be managed, and receives address setting for the map image. Also, the address setting unit 32 receives settings such as correspondence between the address of the map image, identification information of the imaging device 18 that captures the address, and the location or process of the job.

The job ID detection unit 34 detects, for example, the job ID indicated by the barcode image 801 or text on the job ticket 800 for the customer system 10 illustrated in FIG. 2A. The management unit 36 stores available color code IDs in the color code management table storage unit 62. The management unit 36 selects an unused color code ID from the color code management table storage unit 62. The management unit 36 associates and manages the job ID detected by the job ID detection unit 34 with the selected color code ID in the color code management table storage unit 62.

Also, the management unit 36 stores and manages the job information associated with the job ID and the color code ID in the job management table storage unit 64. The job management table storage unit 64 stores location information and history of the job as the job information.

The code image generation unit 38 uses the color code ID provided from the management unit 36 to generate, for example, the color code image 811 illustrated in FIG. 2B. For example, the code image generation unit 38 generates a color code image from the color code ID using the technique described in Japanese Unexamined Patent Application Publication No. 2017-199306 or Japanese Unexamined Patent Application Publication No. 2020-024658.

The print data creation unit 40 creates, for example, print data of the job ticket 810 for the information processing system 12 including the color code image 811 as illustrated in FIG. 2B. Also, the print data creation unit 40 creates print data for the batch ticket described below.

The print instruction unit 42 instructs the printer 16 to print the job ticket 810 for the information processing system 12 to which the color code image 811 illustrated in FIG. 2B is added, or the batch ticket described below.

The captured image acquisition unit 44 acquires the captured image and captured moving image from the imaging device 18. The code image identification unit 46 decodes, for example, the color code image 811 of the job ticket 810 or the color code image of the batch ticket (described below) appearing in the captured image or the captured moving image, and identifies the color code ID.

The code image identification unit 46 provides the management unit 36 with the identification information of the imaging device 18 that captured the color code image 811 of the job ticket 810 or the color code image of the batch ticket described below, and the color code ID identified by decoding.

The management unit 36 identifies the job associated with the color code ID by referring to the color code management table storage unit 62. Also, the management unit 36 identifies the location or process associated with the identification information of the imaging device 18 by referring to the setting information storage unit 60.

In this way, the management unit 36 stores the location or process of the job associated with the color code ID in the job management table storage unit 64 as the location or process identified from the identification information of the imaging device 18. The management unit 36 manages the status of the job including the location (current location) or the process (current process) at which the object to be managed is located.

Each functional unit of the customer system 10 and the information processing apparatus 14 may be configured as the information processing apparatus or a web server on the internet and provided as a cloud service. For example, the information processing apparatus 14 may receive a request from a user terminal through a network such as the internet and return a response. The information processing apparatus 14 receives the captured image from the imaging device 18, identifies the job ticket 810 or the batch ticket (described below), transmits screen data to software such as a web browser of the user terminal, and may display the location or process of the object to be managed in real time.

Figure 5:
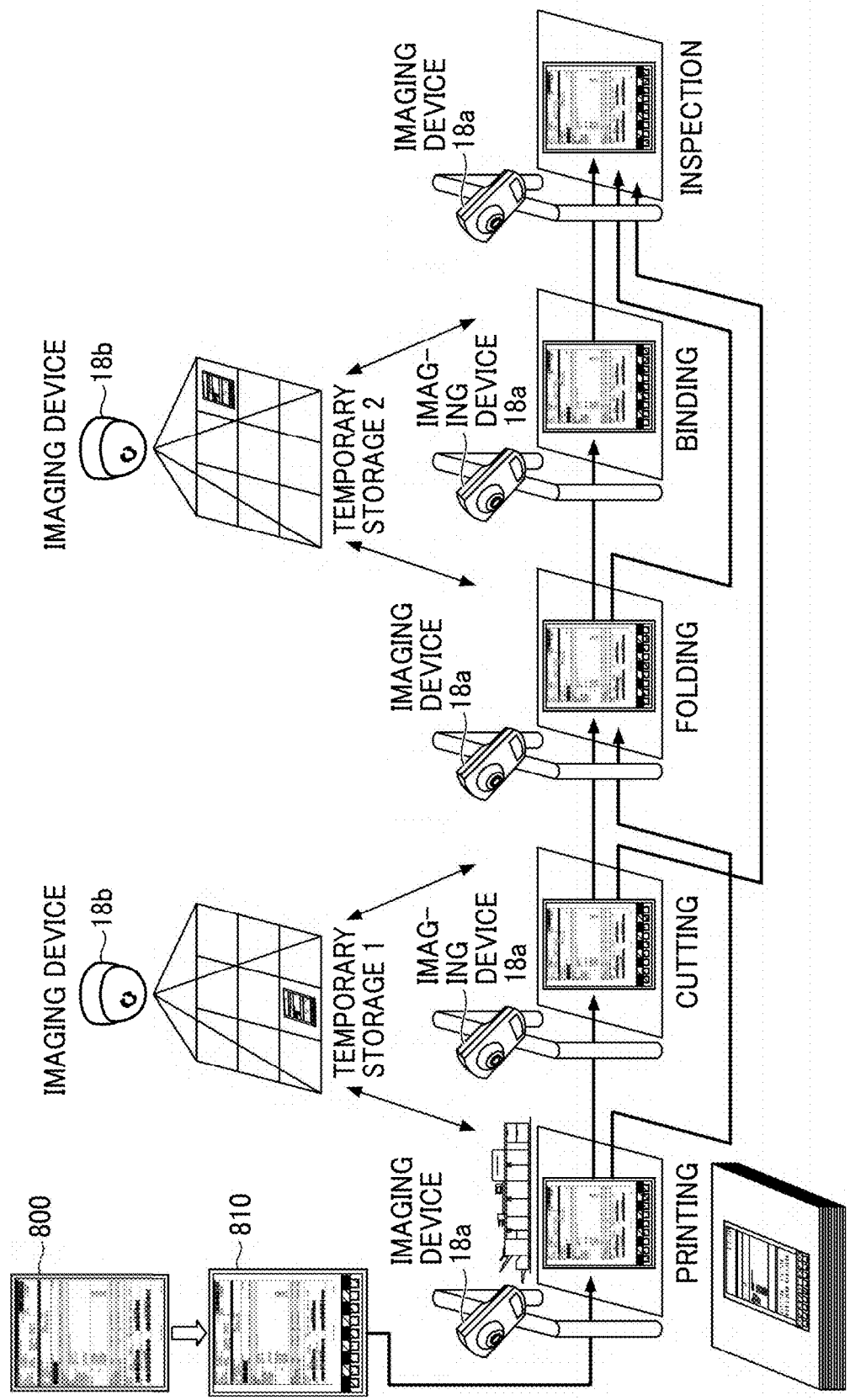
FIG. 5 is a conceptual diagram illustrating an example of a job process in a printing factory.

FIG. 5 is a conceptual diagram illustrating an example of a job process in the printing factory. For example, steps in FIG. 5 include "printing", "cutting", "folding", "binding", "inspection", "temporary storage 1", and "temporary storage 2". The imaging device 18a is installed at a gate in front of the place where the processes "printing", "cutting", "folding", "bookbinding" and "inspection" are performed. In addition, the imaging device 18b is installed at a place where the steps "temporary storage 1" and "temporary storage 2" are performed.

The job ticket 810 for the information processing system 12 or the batch ticket described below, is captured by the imaging device 18a or 18b in the process of moving between processes or while being stored in a temporary storage location. As illustrated in FIG. 5, in the printing factory, the movement between the processes is not constant, and there are cases where the job ticket 810 for the information processing system 12 or the batch ticket (described below) is not captured and recorded depending on the job. FIG. 5 illustrates, as an example, an arrow representing movement of the job that includes all processes and an arrow representing movement of the job that skips part of the processes.

In FIG. 5, after the printed matter is output by the process "printing", the job ticket 810 for the information processing system 12 or the batch ticket described below is attached. The printed matter to which the job ticket 810 for the information processing system 12 or the batch ticket (described below) is attached is the object to be managed. In the example of FIG. 5, the job ticket 810 for the information processing system 12 or the batch ticket (described below) attached on the object to be managed is captured by the imaging device 18a or 18b while the printed matter passes through the gate or stored at the temporary storage location.

Figure 6:
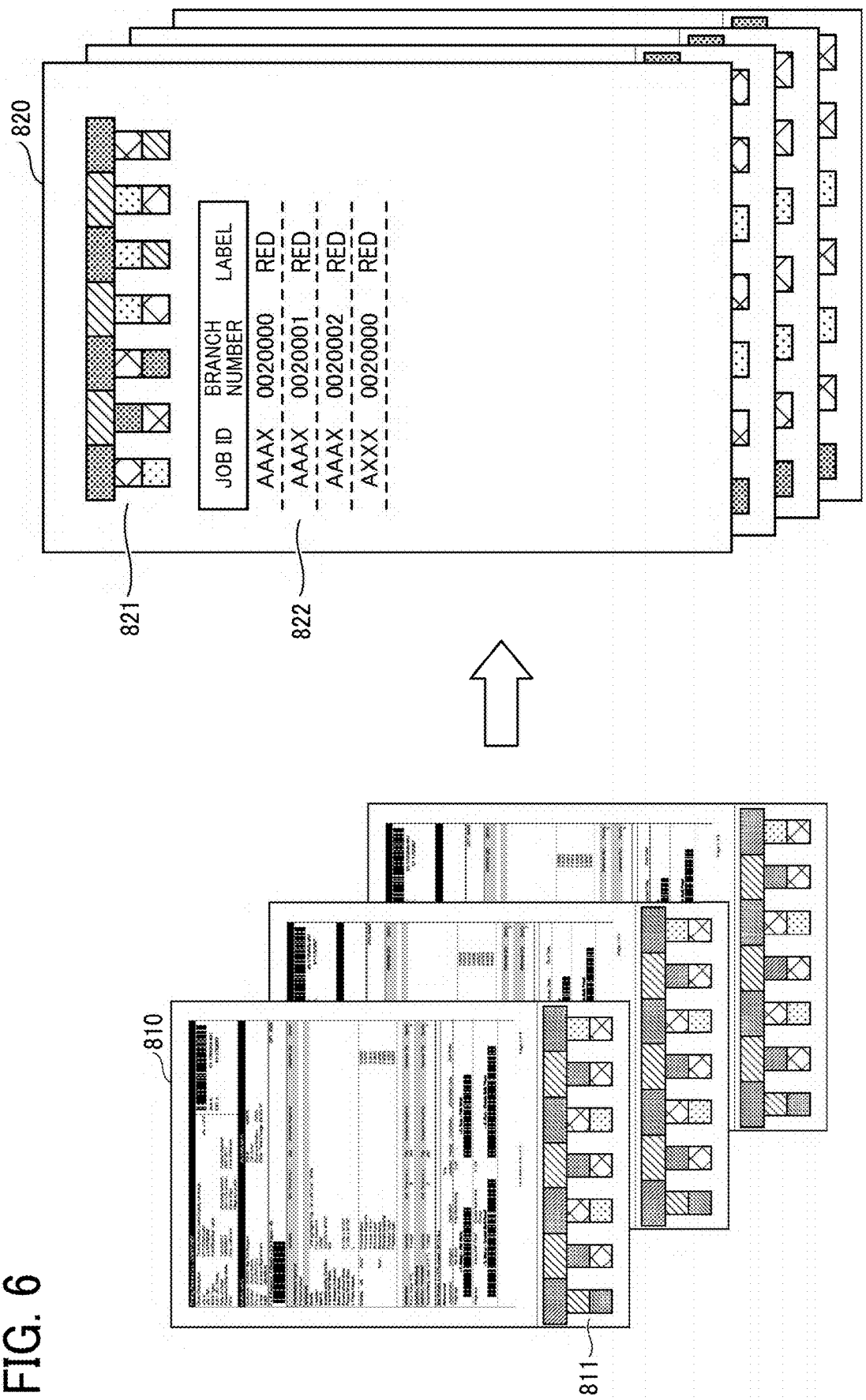
FIG. 6 is a diagram illustrating an example of a batch ticket according to embodiments of the present disclosure.

FIG. 6 is a diagram illustrating an example of the batch ticket according to the present embodiment. For example, printed matter of a plurality of jobs may be mixed on the place associated with a process (for example, one pallet or table for placing the printed matter).

When the printed matter of the plurality of jobs are mixed, the job tickets 810 are to be arranged on a limited area such as an upper surface of the printed matter so that all the color code images 811 of the job tickets 810 for the information processing system 12 are captured from the imaging device 18. However, there is a limit to the number of job tickets 810 that can be arranged on the upper surface of the printed matter. Depending on the number of job tickets 810 arranged on the upper surface of the printed matter, the number of jobs that can be mixed in the place associated with a process is limited. In addition, arranging the job tickets 810 on the upper surface of the printed matter takes a lot of work for the user. Furthermore, the job tickets 810 arranged on the upper surface of the printed matter may be shifted and overlapped during work, and the color code image 811 may not be captured by the imaging device 18.

For example, in the printing factory, there are places where printed matter is stagnant, and the printed matter of the plurality of jobs may be piled up in a place associated with one process. However, the job ticket 810 for each job is to be in a condition in which the imaging device 18 is able to capture the color code image 811 and prevented from being overlapped.

In the present embodiment, the batch ticket 820 for collectively identifying the primed matter of the plurality of jobs is used. The batch ticket 820 is provided with the color code image 821 for the batch ticket 820. Also, the batch ticket 820 displays a list of corresponding individual jobs.

As illustrated in FIG. 6, color codes (primary codes) of the plurality of job tickets 810 are associated with a color code (secondary code) of one batch ticket 820. The batch ticket 820 may be used as a cover page for the plurality of job tickets 810. The batch ticket 820 is used as the cover page by bundling the plurality of bundled job tickets 810 and attaching the batch ticket 820 on the top.

As another example of the batch ticket, the color codes of the job tickets 810 may be arranged on one sheet, but a limit to the number of color codes that can be arranged and a mechanism to prevent double detection at different locations are to be prepared.

Figure 7:
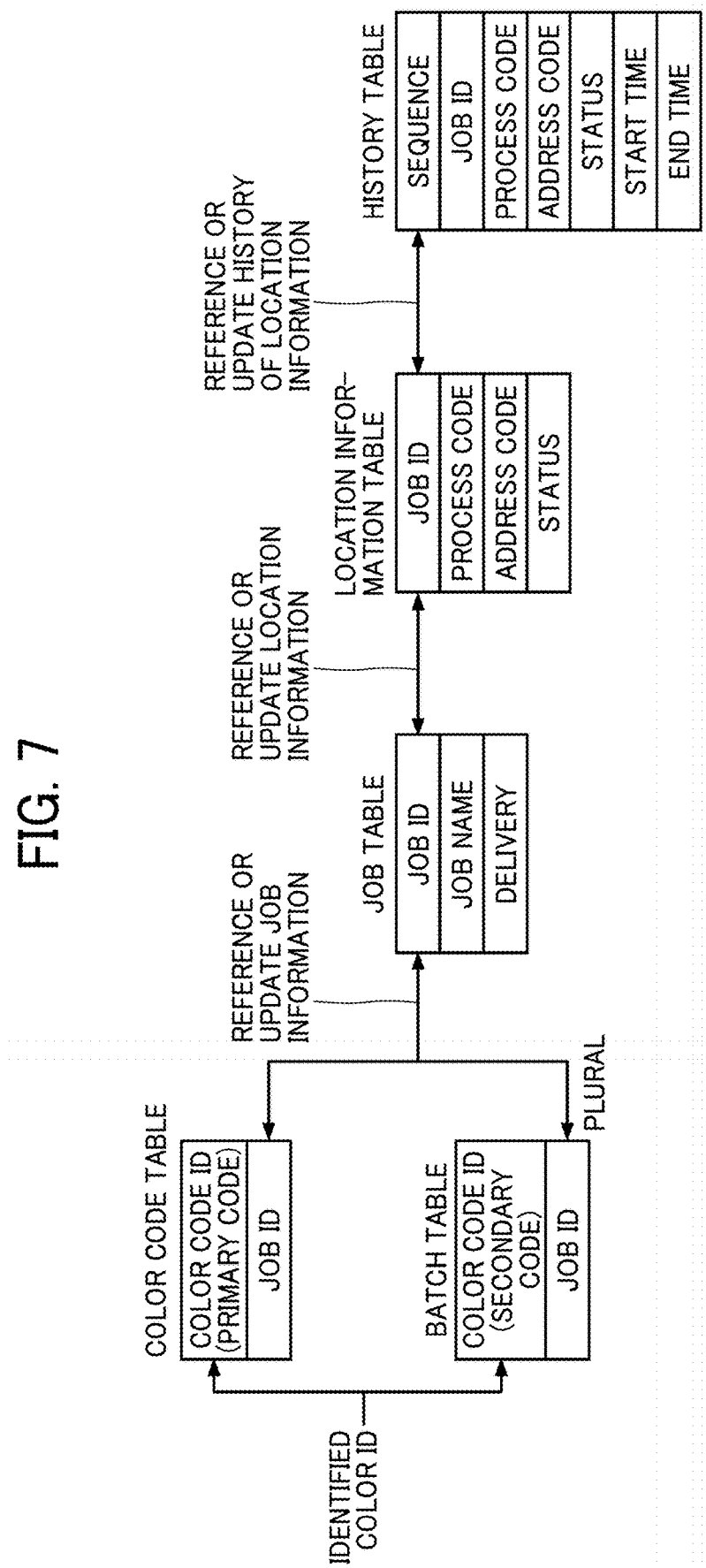
FIG. 7 is a diagram illustrating an example of a data structure for managing a job ticket and the batch ticket.

The plurality of job tickets 810 and the batch ticket 820 illustrated in FIG. 6 are managed by a data structure, for example, as illustrated in FIG. 7. FIG. 7 is a diagram illustrating an example of the data structure for managing the job ticket and the batch ticket.

The color code ID for the batch ticket 820 is issued separately from the color code ID for the job ticket 810. The color code ID of the batch ticket 820 and the color code ID of the job ticket 810 may have different ranges of color code IDs to be used, or a part of branch of the color code image 821 to be used may be fixed (unified color pattern).

As illustrated in FIG. 6, the information processing apparatus 14 identifies the job ticket 810 or the batch ticket 820 from the identified color code ID. In response to identifying the color code ID of the job ticket 810, a job ID associated with that color code ID is identified, and job information of the job associated with the job ID is referenced or updated.

In response to identifying the color code ID of the batch ticket 820, a plurality of job IDs associated with the color code ID are identified and the job information of the plurality of jobs associated with the job ID is referenced or updated.

Figure 8:
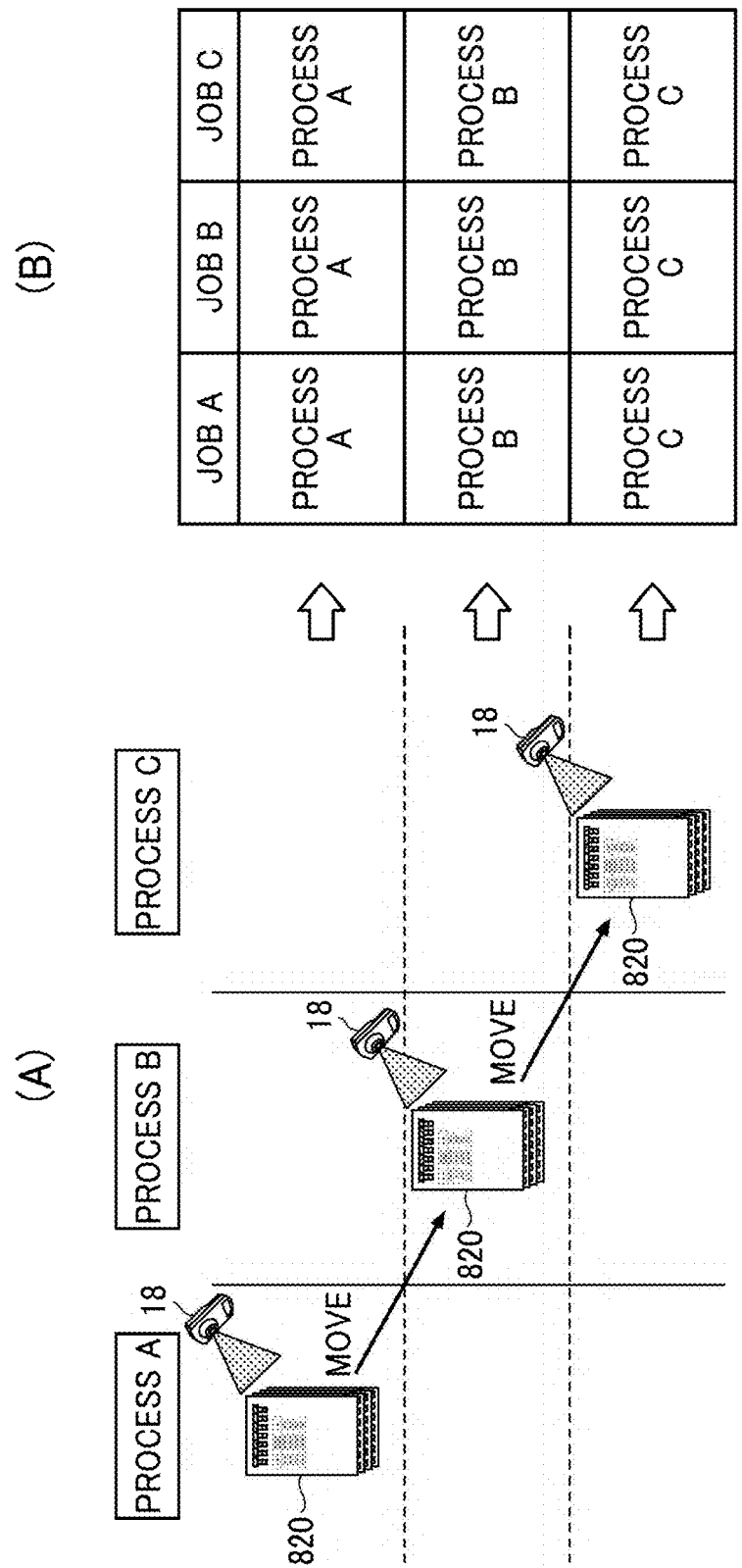
FIG. 8 is a diagram illustrating an example of batch update of job information using a batch ticket.

By using the batch ticket 820, the information processing apparatus 14 collectively updates the job information of the plurality of jobs, for example, as illustrated in FIG. 8. FIG. 8 is a diagram illustrating an example of collectively updating the job information using the batch ticket.

FIG. 8 illustrates an example of the batch ticket 820 in which job A, job B, and job C are bundled. By identifying the batch ticket 820 from the image captured by the imaging device 18 associated with a process A, the information processing apparatus 14 updates the job information item indicating the location or process of job A, job B, and job C to the location or process associated with the process A.

Assume that the printed matter associated with the job A, job B, and job C moved from the location associated with the process A to the location associated with the process B. The information processing apparatus 14 detects the batch ticket 820 from the image captured by the imaging device 18 associated with the process B. By identifying the batch ticket 820 from the image captured by the imaging device 18 associated with the process B, the information processing apparatus 14 updates the job information item indicating the location or process of job A, job B, and job C to the location or process associated with the process B.

Assume that the printed matter associated with the job A, job B, and job C moved from the location associated with the process B to the location associated with the process C. The information processing apparatus 14 detects the batch ticket 820 from the image captured by the imaging device 18 associated with the process C. By identifying the batch ticket 820 from the image captured by the imaging device 18 associated with the process C, the information processing apparatus 14 updates the job information item indicating the location or process of job A, job B, and job C to the location or process associated with the process C.

In this way, the information processing apparatus 14 detects the batch ticket 820 from the image captured by the imaging device 18 provided at the location associated with the process of the job in the printing factory, and updates the location or process of the plurality of jobs associated with the batch ticket 820 to the location or process associated with the imaging device 18.

Figure 9:
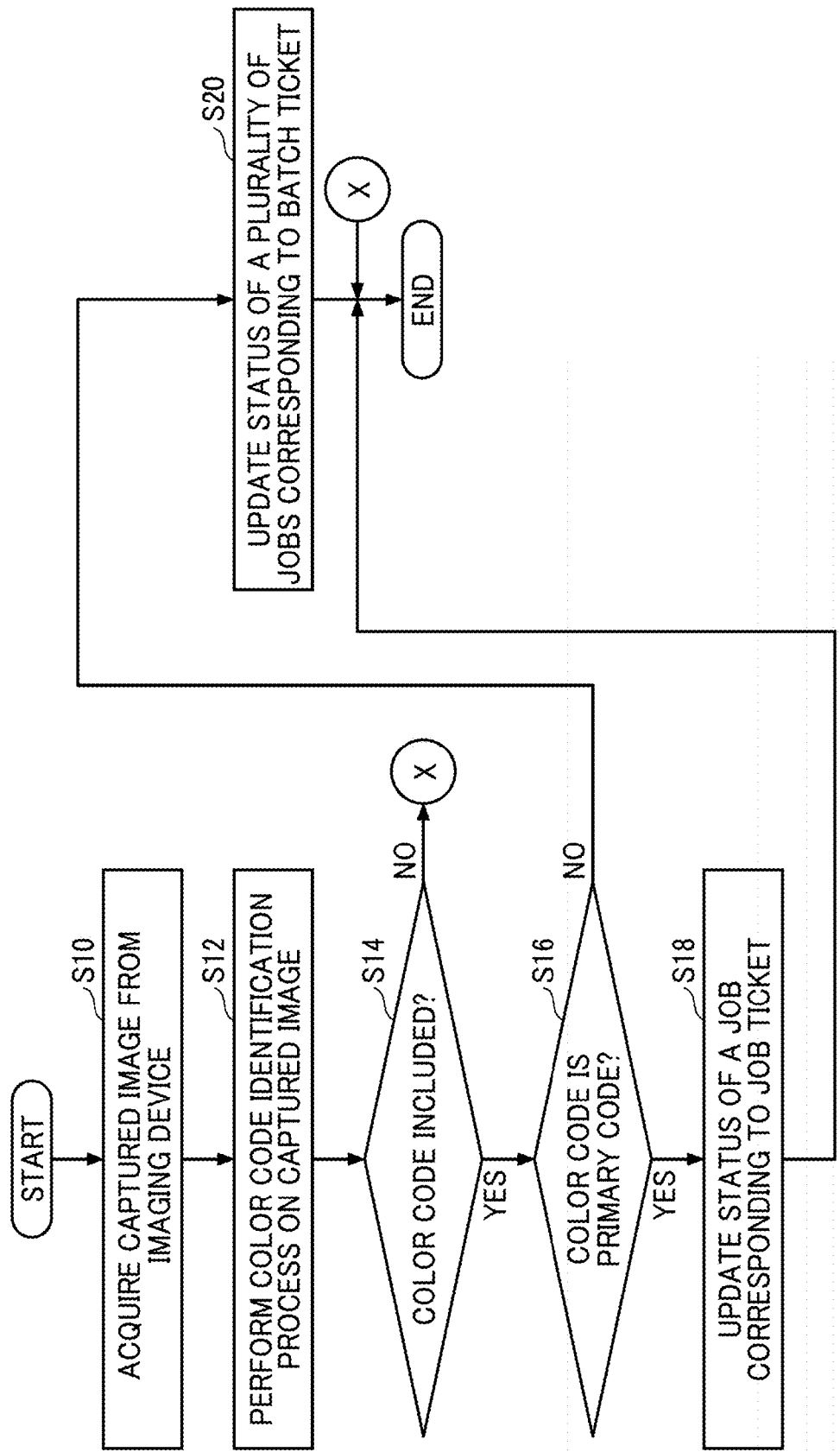
FIG. 9 is a flowchart illustrating an example of a batch update process of job information using the batch ticket.

FIG. 9 is a flowchart illustrating an example of a process to collectively updating the job information using the batch ticket. In step S10, the captured image acquisition unit 44 of the information processing apparatus 14 acquires a captured image from the imaging device 18 provided at the location associated with the job process in the printing factory.

In step S12, the code image identification unit 46 of the information processing apparatus 14 performs color code identification process of the captured image. The color code identification process is a process of decoding the color code image from the acquired captured image and trying to identify the color code ID. The code image identification unit 46 identifies the color code ID from the color code image included in the acquired captured image. The code image identification unit 46 provides the management unit 36 with the identified color code ID and the identification information of the imaging device 18 that captured the acquired captured image.

In step S14, the management unit 36 of the information processing apparatus 14 determines whether the captured image acquired in step S10 includes a color code image. Based on a determination that the captured image acquired in step S10 does not include the color code image, the management unit 36 terminates the process illustrated in FIG. 9.

Based on a determination that the captured image acquired in step S10 includes the color code image, the management unit 36 determines whether the color code ID identified by the code image identification unit 46 in step S12 is a primary code. The management unit 36 determines whether the color code ID identified in step S12 is the primary code associated with the job ticket 810.

The management unit 36 determines whether the identified color code ID is the primary code associated with the job ticket 810 or the secondary code associated with the batch ticket 820 by referring to the color code management table storage unit 62.

Based on a determination that the color code ID identified in step S12 is the primary code associated with the job ticket 810, the management unit 36 proceeds to step S18 and updates the job information (process, address, status, etc.) of the job associated with the identified job ticket 810.

Based on a determination that the color code ID identified in step S12 is the secondary code associated with the batch ticket 820, the management unit 36 proceeds to step S20 and updates the job information (process, address, status, etc.) of a plurality of jobs associated with the identified batch ticket 820.

According to the process of the flowchart of FIG. 9, the information processing system 12 according to the present embodiment implements the batch ticket 820 that collectively identifies the printed matter associated with the plurality of jobs from the captured image. The information processing system 12 according to the present embodiment facilitates management of the location or process of a plurality of objects to be managed even when objects to manage the location or the process are mixed in the same place.

Figure 10:
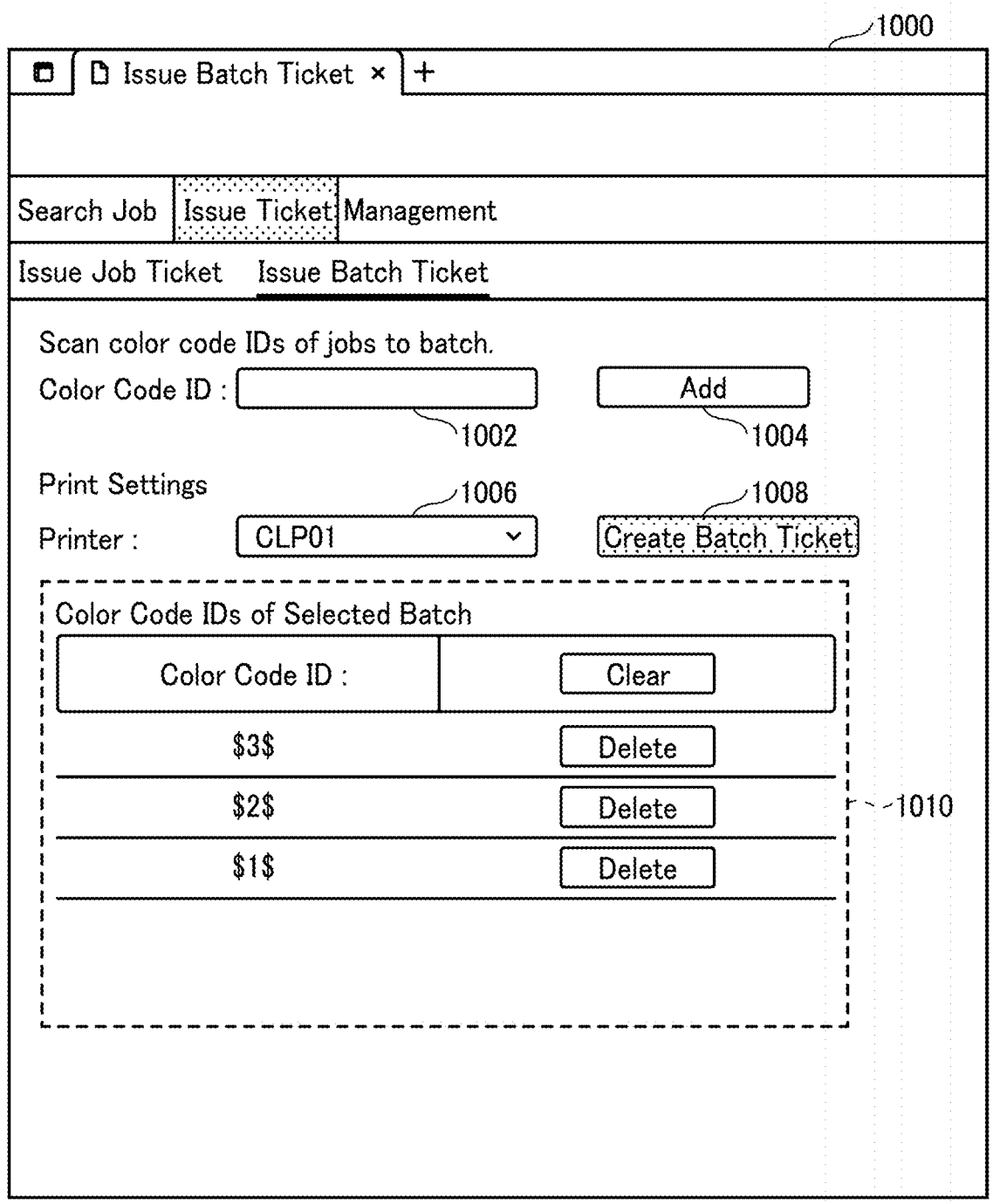
FIG. 10 is a diagram illustrating an example of a screen for issuing the batch ticket.

The user issues the batch ticket 820 according to the present embodiment from a screen 1000, for example, as illustrated in FIG. 10. FIG. 10 is a diagram illustrating an example of the screen for issuing the batch ticket.

A color code field 1002 on the screen 1000 is a field for inputting the color code ID of the job ticket 810 to be bundled in a batch. The input of the color code ID in the color code field 1002 may be performed manually by the user, by scanning the barcode of the job ticket 810, or by reading from the color code ID in a file such as a comma separated value (CSV) file. Also, the input of the color code ID to the color code field 1002 may be performed by scanning the color code image 821 of the job ticket 810.

By pressing an add button 1004, the user adds the color code ID in the color code field 1002 to the list 1010 of selected batch target color code IDs. The user also sets the printer 16 for printing the batch ticket 820 in a printer field 1006. Note that a default printer 16 for each user may be designated in the printer field 1006.

By pressing a batch ticket creation button 1008, the user requests the information processing apparatus 14 to issue the batch ticket 820 for bundling the selected batch target color code IDs in the list 1010.

Figure 11:
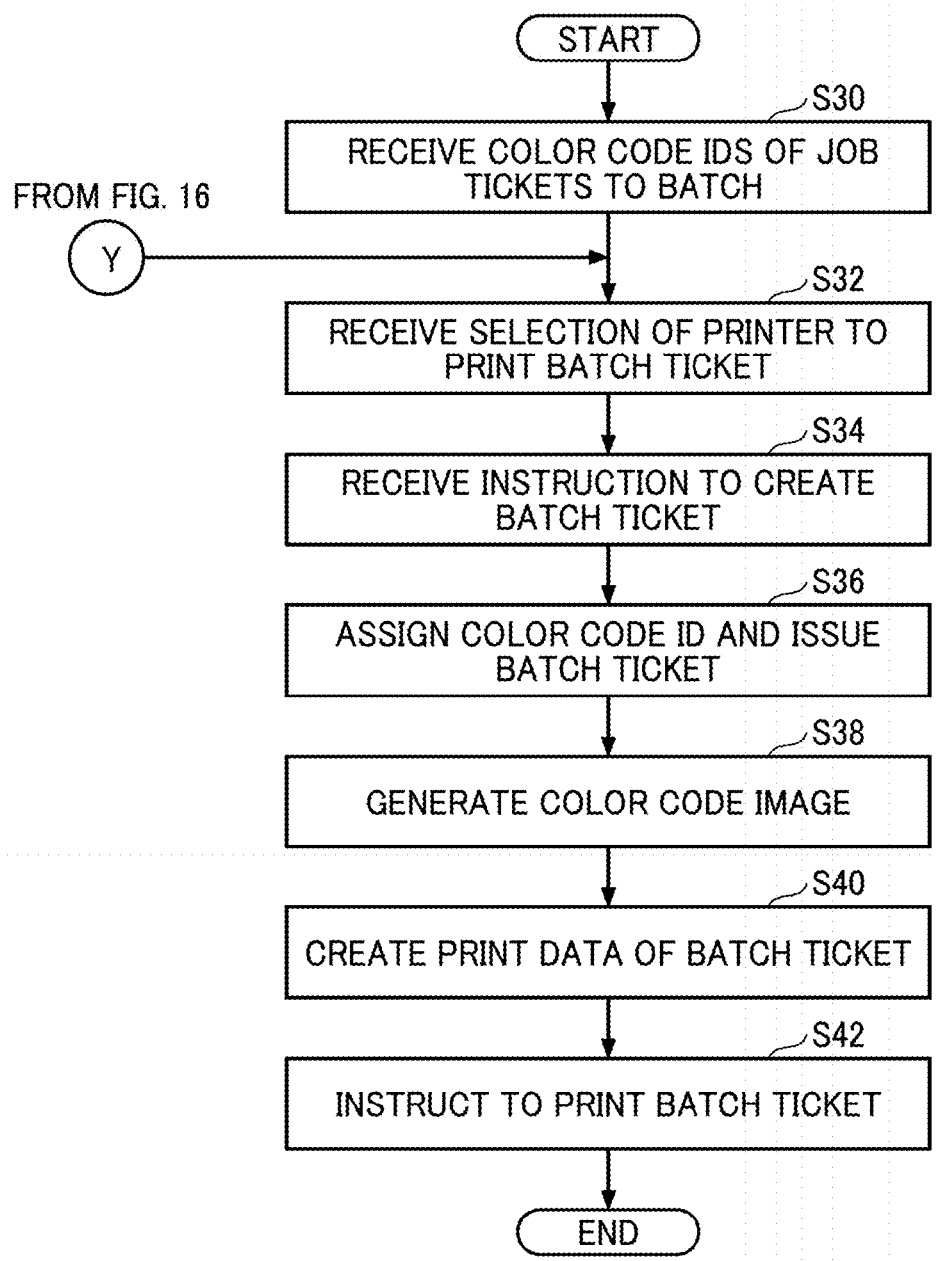
FIG. 11 is a flowchart illustrating an example of a process for issuing the batch ticket according to embodiments of the present disclosure.

The information processing apparatus 14 issues the batch ticket 820 according to the operation by the user on the screen 1000, for example, according to the process illustrated in FIG. 11. FIG. 11 is a flowchart illustrating an example of a process for issuing the batch ticket according to the present embodiment.

In step S30, the display control unit 50 of the UI unit 30 of the information processing apparatus 14 presents the user with a screen 1000 illustrated in FIG. 10, as an example. The selection reception unit 52 of the UI unit 30 receives from the user, an input of the color code ID of the job ticket 810 to be bundled.

In step S32, the selection reception unit 52 receives from the user, a selection of the printer 16 for outputting the batch ticket 820. In step S34, the selection reception unit 52 receives from the user, an instruction to create the batch ticket 820. In step S36, the management unit 36 of the information processing apparatus 14 assigns an unused color code ID and issues the batch ticket 820.

In step S38, the code image generation unit 38 of the information processing apparatus 14 generates the color code image 821 of the batch ticket 820 illustrated in FIG. 6, for example, using the issued color code ID assigned to the batch ticket 820. In step S40, the print data creation unit 40 of the information processing apparatus 14 creates print data of the batch ticket 820 including the color code image 821 of FIG. 6, for example. In step S42, the print instruction unit 42 of the information processing apparatus 14 instructs the printer 16 to print, for example, the batch ticket 820 to which the color code image 821 of FIG. 6 is attached.

As described above, the information processing system 12 according to the present embodiment facilitates issuing of the batch ticket 820 for collectively identifying the plurality of job tickets 810. The batch ticket 820 enables to identify a plurality of objects to be managed placed at the same location even in the location with a limited area where the plurality of objects to be managed are mixed, and facilitates management of locations or processes of the plurality of objects to be managed.

In the first embodiment, the batch ticket 820 for collectively identifying the plurality of job tickets 810 is described. In a second embodiment, processing of the job tickets 810 of some jobs and printed matter taken out from the plurality of jobs collectively identified by the batch ticket 820 is described.

Figure 12:
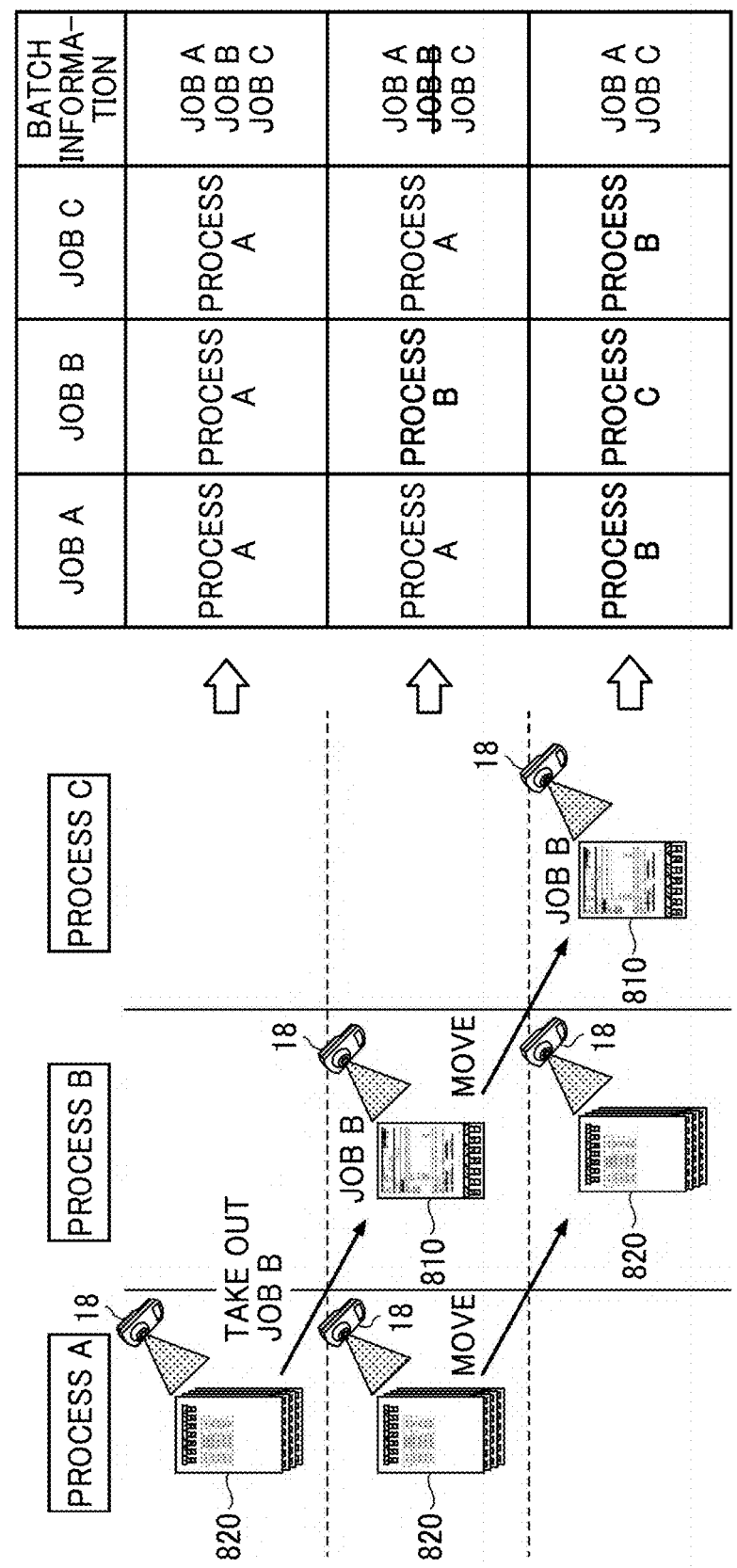
FIG. 12 is a diagram illustrating an example of cancelling association between the batch ticket and the job ticket.

By using the batch ticket 820, the information processing apparatus 14 collectively updates the job information of the plurality of jobs. Also, by using the batch ticket 820, when the job tickets 810 bundled by the batch ticket 820 as illustrated as an example in FIG. 12 is identified from the captured image, the information processing apparatus 14 may cancel association between the job ticket 810 and the batch ticket 820. FIG. 12 is a diagram illustrating an example of cancelling association between the batch ticket and the job ticket.

FIG. 12 illustrates an example of the batch ticket 820 in which job A, job B, and job C are bundled. By identifying the batch ticket 820 from the image captured by the imaging device 18 associated with the process A, the information processing apparatus 14 updates the job information item indicating the location or process of job A, job B, and job C to the location or process associated with the process A.

In the next step, assume that the user moved the job ticket 810 and printed matter associated with the job B from the location associated with the process A to the location associated with the process B. The information processing apparatus 14 detects the job ticket 810 associated with the job B from the image captured by the imaging device 18 associated with the process B. Further, the information processing apparatus 14 detects the batch ticket 820 from the image captured by the imaging device 18 associated with the process A.

Accordingly, when the job ticket 810 associated with the job B bundled by the batch ticket 820 is identified at the location associated with the process B, which is different from where the batch ticket 820 is identified, the information processing apparatus 14 determines that the job B has advanced to the process B. The information processing apparatus 14 updates the item of job information indicating the location or process of the job B to the location or process associated with the process B. Further, the information processing apparatus 14 manages the job ticket 810 associated with the job B as not being bundled by the batch ticket 820.

In the next step, assume that the printed matter associated with the job A and the job C is moved from the location associated with the process A to the location associated with the process B. Also, assume that the printed matter associated with the job B is moved from the location associated with the process B to the location associated with the process C.

The information processing apparatus 14 detects the batch ticket 820 from the image captured by the imaging device 18 associated with the process B. The information processing apparatus 14 detects the job ticket 810 associated with the job B from the image captured by the imaging device 18 associated with the process B. By detecting the batch ticket 820 from the image captured by the imaging device 18 associated with the process B, the information processing apparatus 14 updates the item of job information indicating the location or process of job A, job B, and job C to the location or process associated with the process B. By identifying the job ticket 810 associated with the job B from the image captured by the imaging device 18 associated with the process C, the information processing apparatus 14 updates the item of job information indicating the location or process of the job B with the location or process associated with the process C.

By cancelling the association between the batch ticket 820 and the job ticket 810 as illustrated in FIG. 12, the association between the batch ticket 820 and the job ticket 810 is canceled without causing inconvenience to the user in the information processing system 12 of the present embodiment.

Figure 13:
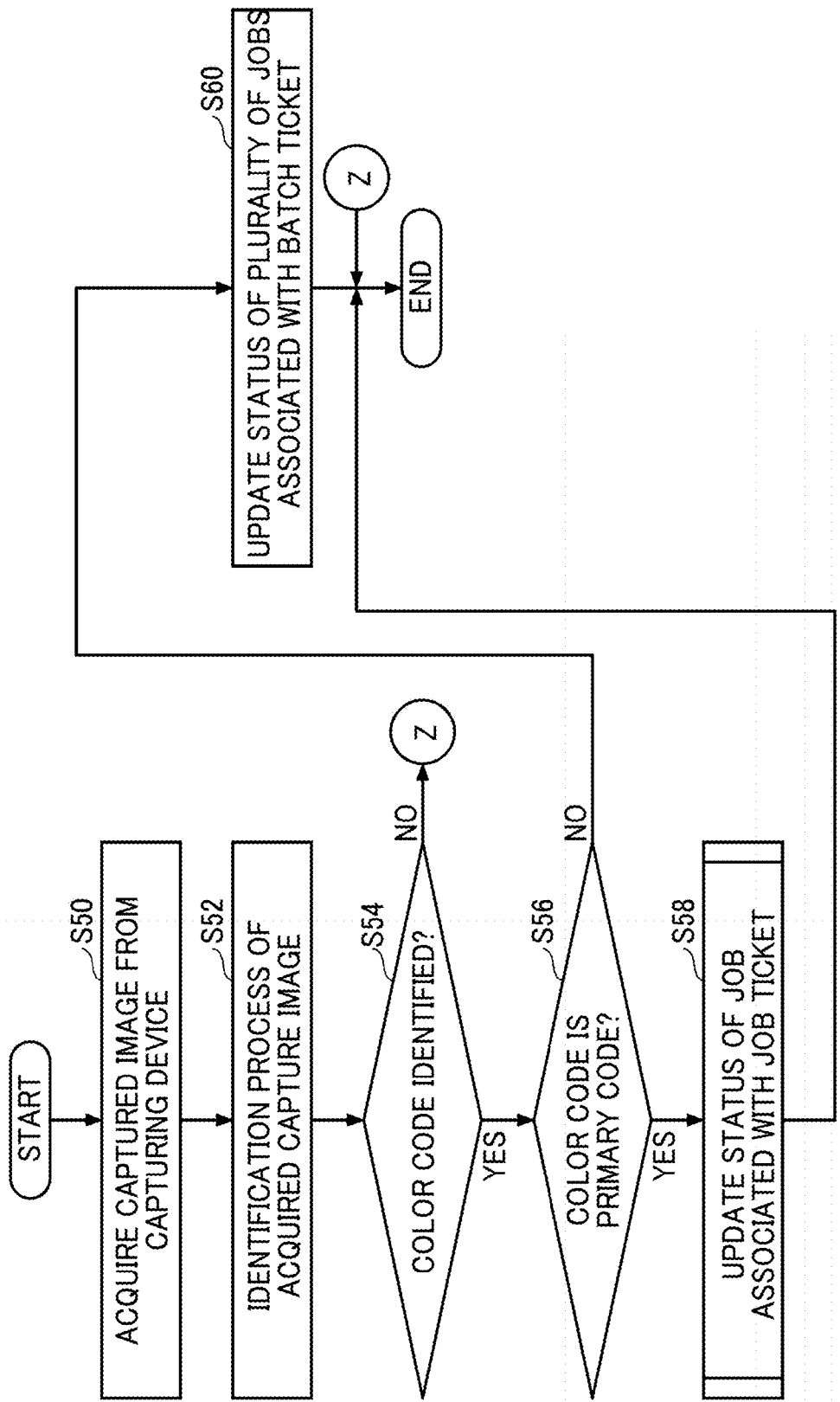
FIG. 13 is a flowchart illustrating an example of a batch update process of job information for cancelling the association between the batch ticket and the job ticket.

FIG. 13 is a flowchart illustrating an example of a process of collectively updating the job information for cancelling the association between the batch ticket and the job ticket. In step S50, the captured image acquisition unit 44 of the information processing apparatus 14 acquires the captured image from the imaging device 18 installed at the location associated with the job process in the printing factory.

In step S52, the code image identification unit 46 of the information processing apparatus 14 performs color code identification processing of the captured image. The code image identification unit 46 provides the management unit 36 with the identified color code ID and the identification information of the imaging device 18 that captured the acquired captured image.

In step S54, the management unit 36 of the information processing apparatus 14 determines whether the captured image acquired in step S50 includes the color code image. Based on a determination that the captured image acquired in step S50 does not include the color code image, the management unit 36 terminates the processing illustrated in FIG. 13.

Based on a determination that the captured image acquired in step S50 includes the color code image, the management unit 36 performs the process of step S56. In step S56, the management unit 36 determines whether the color code ID identified by the code image identification unit 46 in step S52 is the primary code associated with the job ticket 810.

Figure 14:
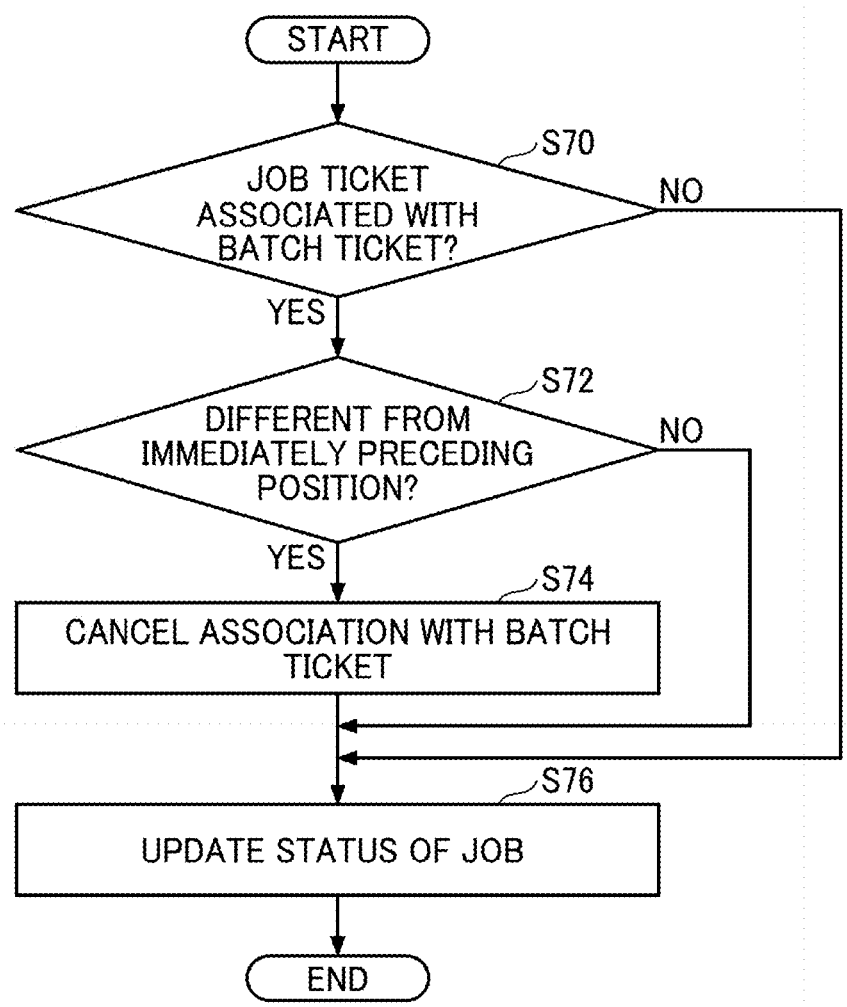
FIG. 14 is a flowchart illustrating an example of a process performed in step S58.

Based on a determination that the color code ID identified in step S52 is the primary code associated with the job ticket 810, the management unit 36 proceeds to step S58 and performs, for example, the processing illustrated in FIG. 14. FIG. 14 is the flowchart illustrating an example of a process performed in step S58. In step S70, the management unit 36 determines whether the identified job ticket 810 is associated with the batch ticket 820.

Based on a determination that the identified job ticket 810 is associated with the batch ticket 820, the management unit 36 proceeds to step S72 and determines whether the location or process of the job associated with the job ticket 810 is different from the previous location or process stored in the job management table storage unit 64. Based on a determination that the location or process of the job associated with the job ticket 810 is different from the immediately preceding location or process, the management unit 36 proceeds to step S74 and cancels the association with the batch ticket 820. Based on a determination that the location or process of the job associated with the job ticket 810 is the same with the previous location or process, the management unit 36 skips step S74. In step S76, the management unit 36 updates the job information (process, address, status, etc.) of the job associated with the identified job ticket 810.

Also, based on a determination in step S56 of FIG. 13 that the color code ID identified in step S52 is the secondary code associated with the batch ticket 820, the management unit 36 updates the job information (process, address, status, etc.) of the plurality of jobs associated with the identified batch ticket 820, in step S60.

According to the processing illustrated in the flowcharts of FIGS. 13 and 14, in the case the job ticket 810 bundled by the batch ticket 820 is identified from the captured image, the association between the job ticket 810 and the batch ticket 820 can be canceled. The information processing system 12 according to the present embodiment treats the color code ID of the job ticket 810 as the primary code and the color code ID of the batch ticket 820 as the secondary code, and the location or process of the job is managed depending on whether the primary code or the secondary code is identified from the captured image. Note that in the process illustrated in the flowcharts of FIGS. 13 and 14, the updating may be performed at predetermined time intervals, such as 10 minutes, in order to prevent the location or process of the job from being erroneously updated while moving the object to be managed.

For example, when the primary code is identified in the captured image, the location or process associated with the imaging device 18 of the captured image in which the primary code is identified is set as the location or process of the job. Further, when the secondary code is identified in the captured image, the location or process associated with the imaging device 18 of the captured image in which the secondary code is identified is set as the location or process of the job.

Before the job ticket 810 and the printed matter of a part of the jobs collectively identified by the batch ticket 820 are taken out, the location or process associated with the imaging device 18 of the captured image whose secondary code has been identified is the location or process of the job, since the color code ID of the secondary code of the batch ticket 820 is identified.

In the case the job ticket 810 and the printed matter of the part of the jobs collectively identified by the batch ticket 820 is taken out, the location or process associated with the imaging device 18 of the captured image whose primary code has been identified is the location or process of the job, since the identified color code ID of the job ticket 810 is the primary code.

Also, in the case the job ticket 810 and printed matter of the part of the jobs collectively identified by the batch ticket 820 is taken out and then returned, the location or process associated with the imaging device 18 of the captured image whose secondary code has been identified is the location or process of the job, since the color code ID of the primary code of the job ticket 810 is not identified.

As described above, in the information processing system 12 according to the present embodiment, the batch ticket 820 that prevents mismanagement of the location or process can be implemented, even when the job tickets 810 and printed matters of a part of the plurality of jobs collectively identified by the batch tickets 820 is removed or returned. The information processing system 12 according to the present embodiment facilitates management of the location or process of a plurality of object to be managed even when objects to manage the location or process are mixed in the same place.

Figure 15:
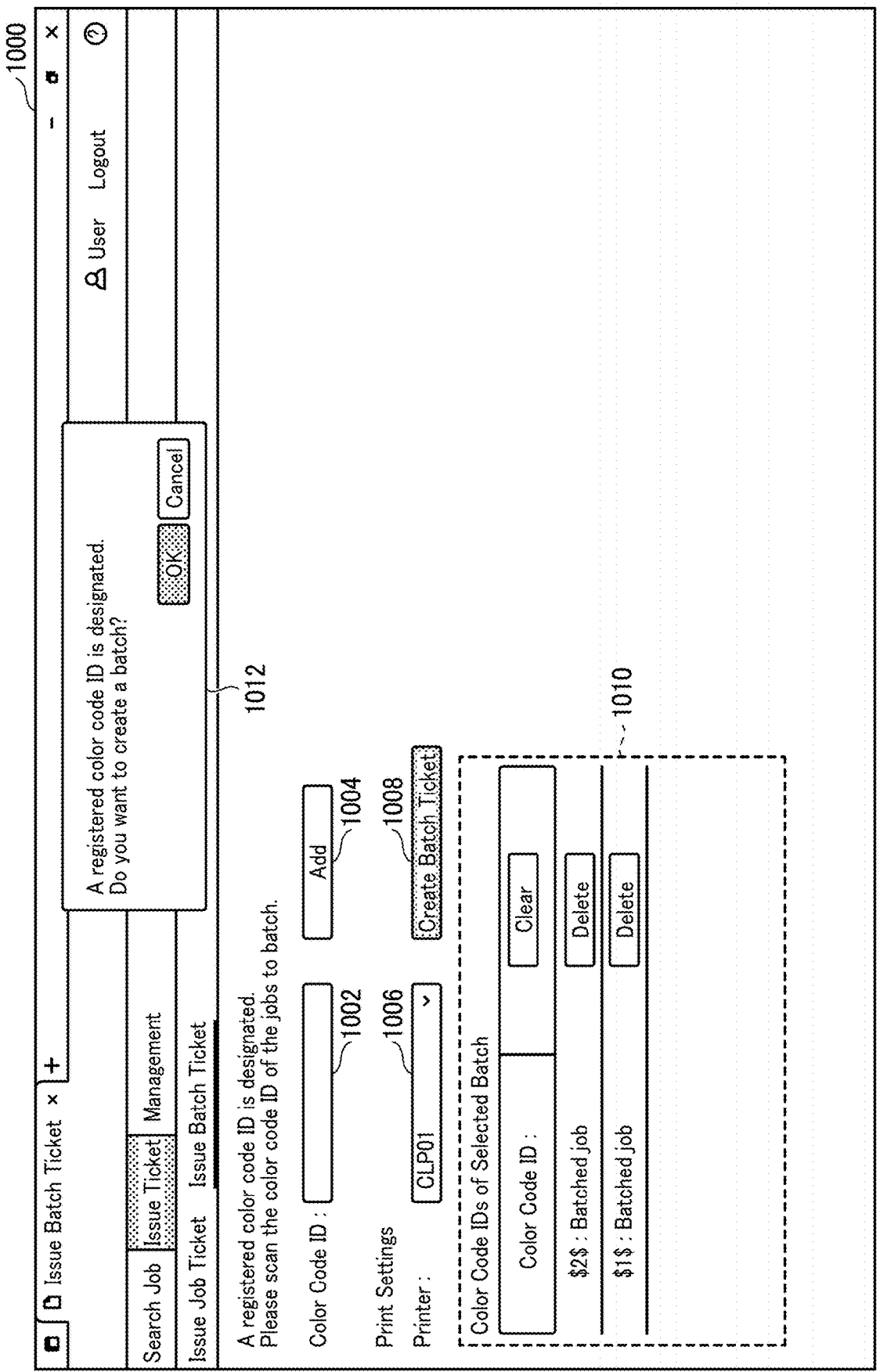
FIG. 15 is a diagram illustrating an example of a screen for issuing the batch ticket.

In the first embodiment, the batch ticket 820 is issued from the screen 1000, for example, as illustrated in FIG. 10. In a third embodiment, in a case the color code ID entered by the user in the color code field 1002 is already assigned to a batch, a confirmation message 1012 illustrated as an example in FIG. 15 is displayed for confirmation by the user. FIG. 15 is a diagram illustrating an example of the screen for issuing the batch ticket. In FIG. 15, in addition to the confirmation message 1012, a message stating that the color code ID entered by the user in the color code field 1002 is already registered is displayed.

FIG. 16 is a flowchart illustrating an example of a process for issuing the batch ticket according to the present embodiment. In step S100, the display control unit 50 of the UI unit 30 of the information processing apparatus 14 presents the user with the screen 1000 illustrated as an example in FIG. 15. The selection reception unit 52 of the UI unit 30 receives from the user, an input of the color code IDs of the job tickets 810 to be bundled.

In step S102, the management unit 36 of the information processing apparatus 14 determines whether the color code IDs input in the color code field 1002 by the user have already been assigned to a batch. Based on a determination that the color code IDs input in the color code field 1002 are not assigned to any batch, the information processing apparatus 14 issues the batch ticket 802 through the processes illustrated in steps S32 to S42 of FIG. 11.

Based on a determination that the color code IDs input in the color code field 1002 have already been assigned to a batch, the display control unit 50 proceeds to step S104 and displays, for example, the confirmation message 1012 of FIG. 15 on the screen 1000. In a case the color code IDs of the job ticket 810 to be bundled is re-input, the selection reception unit 52 returns to the process of step S100.

In step S106, the management unit 36 of the information processing apparatus 14 determines whether the color code IDs are re-input. In the case the color code IDs of the job tickets 810 to be bundled are not re-input, the selection reception unit 52 proceeds to the process of step S108. In step S108, the selection reception unit 52 receives from the user, a selection of the printer 16 for printing the batch ticket 820. In step S110, the selection reception unit 52 receives from the user, an instruction to create the batch ticket 820.

In step S112, the management unit 36 of the information processing apparatus 14 cancels the association between the color code ID input in the color code field 1002 and an old batch ticket 820. In step S114, the management unit 36 assigns an unused color code ID and issues the batch ticket 820.

In step S116, the code image generation unit 38 of the information processing apparatus 14 generates the color code image 821 of the batch ticket 820 illustrated as an example in FIG. 6, using the issued color code ID assigned to the batch ticket 820. In step S118, the print data creation unit 40 of the information processing apparatus 14 creates print data of the batch ticket 820 including the color code image 821 illustrated as an example in FIG. 6. In step S120, the print instruction unit 42 of the information processing apparatus 14 instructs the printer 16 to print the batch ticket 820 to which the color code image 821 is included, illustrated as an example in FIG. 6.

As described above, according to the information processing system 12 of the present embodiment, when the color code ID entered by the user in the color code field 1002 has already been assigned to the batch, the association with the old batch ticket 820 is cancelled, and a new batch ticket 820 is issued.

In the above-described first to third embodiments, an example in which printed matter in the printing factory is used as an object to be managed is described, but the present disclosure is not limited to this example. For example, the objects to be managed may be articles such as products, parts, mailings, and objects to be cleaned. Also, the printing factory may be any other place where the objects to be managed are located, such as other factories, collection points, or warehouses.

The above-described first to third embodiments may be applied to technique of transport systems represented by, for example, an automatic guided vehicle (AGV). In the transport system for transporting articles, batch tickets 820 are attached to a plurality of articles, and batch tickets 820 are captured by the imaging device 18, whereby the processes of the articles being carried by a transport device can be collectively managed.

The first to third embodiments described above may also be applied, for example, for managing the processes of articles carried on a belt conveyor. By applying the technique of the present embodiment to the management of the processes of articles carried on the belt conveyor, the articles carried on the belt conveyor are tracked and branching of the belt conveyor is controlled.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. An information processing system for managing a plurality of objects to be managed, the information processing system comprising:
a plurality of imaging devices configured to capture a plurality of images at respective locations each associated with a location where the object is managed, or a process performed on the object to be managed; and
an information processing apparatus comprising circuitry configured to:
generate print data of a second slip associated with the plurality of objects to be managed, the second slip being different from a first slip associated with each of the plurality of objects, the first slip including a first color code image configured to be captured by the imaging, device for identifying each of the plurality of objects, the second slip including a second color code image configured to be captured by the imaging device for identifying the plurality of objects as being bundled, wherein the first color code image and the second color code image have different color code identifiers, and an association between the first slip and the second slip is cancelled when the first slip is moved to a different location or process from the second slip; and
control a display to display, based on detection of the printed second slip from the image captured by the imaging device, the plurality of objects to be managed associated with the printed second slip, as being placed at the location or the process associated with the imaging device that captured the image of the second slip.

2. The information processing system of claim 1, wherein the circuitry is further configured to:
receive a selection of the plurality of objects to be managed;
generate the second color code image associated with the plurality of objects to be managed for which the selection is received; and
generate the print data of the second slip including the second color code image associated with the plurality of objects to be managed.

3. The information processing system of claim 2, wherein the circuitry is further configured to:
detect the first color code image of the first slip and the second color code image of the second slip from the image captured by the imaging device; and
identify, based on first identification information indicated by the first color code image of the first slip, second identification information indicated by the second color code image of the second slip, and identification information of the imaging device that captured the image, a particular location or process of the object to be managed associated with the first slip, and a particular location or process of the plurality of objects to be managed associated with the second slip, to manage the location or process of each of the object to be managed.

4. The information processing system of claim 3, wherein in a case the object to be managed associated with the first color code image of the first slip is included in the plurality of objects to be managed associated with the second color code image of the second slip, the circuitry is further configured to control the display to display the object to be managed associated with the first color code image of the first slip as being placed in the location or the process associated with the imaging device that captured the image of the first slip.

5. The information processing system of claim 3, wherein in a case the object to be managed associated with the first color code image of the first slip is included in the plurality of objects to be managed associated with the second color code image of the second slip, the circuitry is further configured to control the display to display the location or the process associated with the imaging device that captured the image of the first slip after cancelling the association with the second color code image of the second slip.

6. The information processing system of claim 3, wherein the circuitry is further configured to, in response to receiving a selection of the plurality of objects to be managed associated with another second slip for which the print data has been generated, generate the second color code image of the second slip associated with the plurality of objects to be managed after cancelling the association with the another second slip.

7. The information processing system of claim 2, wherein the circuitry is further configured to notify a user, in response to receiving a selection of the plurality of objects to be managed including an object to be managed associated with another second slip for which the print data has been generated.

8. The information processing system of claim 2, wherein the first color code image includes values that are expressed using color transitions between adjacent cells, and the second color code image includes values that are expressed using color transitions between adjacent cells.

9. The information processing system of claim 1, wherein
the location is a place where the object to be managed or the slip is placed; and
the process is a specific process out of a series of processes for producing or processing the object to be managed.

10. The information processing system of claim 1, wherein
the imaging device is provided above the location so as to capture the images of the first slip and the second slip below.

11. An information processing method for managing a plurality of objects to be managed, the information processing method comprising:
capturing a plurality of images at respective locations each associated with a location where the object is managed, or a process performed on the object to be managed;
generating print data of a second slip associated with the plurality of objects to be managed, the second slip being different from a first slip associated with each of the plurality of objects, the first slip including a first color code image configured to be captured by an imaging device for identifying each of the plurality of objects, the second slip including a second color code image configured to be captured by the imaging device for identifying the plurality of objects as being bundled, wherein the first color code image and the second color code image have different color code identifiers, and an association between the first slip and the second slip is cancelled when the first slip is moved to a different location or process from the second slip; and
displaying, based on detection of the printed second slip from the image captured by the imaging device, the plurality of objects to be managed associated with the printed second slip, as being placed at the location or the process associated with the imaging device that captured the image of the second slip.

12. A non-transitory recording medium which, when executed by one or more processors on an information processing apparatus, causes the processors to perform the information processing method of claim 11.

13. An information processing apparatus comprising:
circuitry configured to:
obtain a plurality of images, captured by a plurality of imaging devices at respective locations each associated with a location where an object is managed, or a process performed on the object to be managed;
generate print data of a second slip associated with a plurality of objects to be managed, the second slip being different from a first slip associated with each of the plurality of objects, the first slip including a first color code image configured to be captured by the imaging device for identifying each of the plurality of objects, the second slip including a second color code image configured to be captured by the imaging device for identifying the plurality of objects as being bundled, wherein the first color code image and the second color code image have different color code identifiers, and an association between the first slip and the second slip is cancelled when the first slip is moved to a different location or process from the second slip; and
control a display to display, based on detection of the printed second slip from the image captured by the imaging device, the plurality of objects to be managed associated with the printed second slip, as being placed at the location or the process associated with the imaging device that captured the image of the second slip.

* * * * *